US011948480B1

(12) United States Patent
Pommier et al.

(10) Patent No.: US 11,948,480 B1
(45) Date of Patent: Apr. 2, 2024

(54) SHELF SIGN SYSTEMS AND METHODS OF MAKING AND USING SAME

(71) Applicant: Ward-Kraft, Inc., Fort Scott, KS (US)

(72) Inventors: Kevin Pommier, Pittsburg, KS (US); Jared Dorsey, Fort Scott, KS (US)

(73) Assignee: Rekon, LLC, Pittsburg, KS (US)

( * ) Notice: Subject to any disclaimer, the term of this patent is extended or adjusted under 35 U.S.C. 154(b) by 0 days.

(21) Appl. No.: 17/804,592

(22) Filed: May 30, 2022

Related U.S. Application Data

(63) Continuation of application No. 17/015,462, filed on Sep. 9, 2020, now Pat. No. 11,348,485.

(60) Provisional application No. 62/897,902, filed on Sep. 9, 2019.

(51) Int. Cl.
*G09F 7/12* (2006.01)
*A47F 5/00* (2006.01)
*G09F 7/18* (2006.01)

(52) U.S. Cl.
CPC .............. *G09F 7/18* (2013.01); *A47F 5/0068* (2013.01); *G09F 7/12* (2013.01); *G09F 2007/127* (2013.01)

(58) Field of Classification Search
CPC ........ G09F 7/18; G09F 7/12; G09F 2007/127; A47F 5/0068; A47F 5/00; F16B 45/00; F16M 13/02
See application file for complete search history.

(56) References Cited

U.S. PATENT DOCUMENTS 4,483,502 A * 11/1984 Fast ...................... A47F 5/0068 248/223.41
4,541,598 A 9/1985 Villanueva et al.
4,572,380 A * 2/1986 Langwell .............. A47F 5/0068 402/19
4,718,627 A * 1/1988 Fast ...................... A47F 5/0068 248/222.12
4,832,207 A * 5/1989 Alexander .............. G09F 3/204 40/658
5,405,022 A * 4/1995 Rissley ................. A47F 5/0006 211/113
10,053,265 B2 * 8/2018 Pitts ..................... B65D 75/566
2004/0074128 A1 * 4/2004 Best ........................ G09F 3/10 40/673

FOREIGN PATENT DOCUMENTS

JP 20030039867 A 2/2003

* cited by examiner

*Primary Examiner* — Cassandra Davis
(74) *Attorney, Agent, or Firm* — AVEK IP, LLC

(57) ABSTRACT

A shelf sign system comprises a base portion having a shelf member configured to be secured to a shelf. The shelf member has a groove. An elongated extender extends from the shelf member adjacent the groove. A sign receiver is arranged at an end of the extender opposite the shelf member and comprises a neck that is proximate the extender relative to a head of the sign receiver. A first sign portion is configured to be removably coupled to the sign receiver. Each of two opposing surfaces of the first sign portion is configured to be printable. The first sign portion comprises a coupling opening having an enlarged central aperture. A second sign portion is configured to be removably coupled to the sign receiver.

14 Claims, 7 Drawing Sheets

SHELF SIGN SYSTEMS AND METHODS OF MAKING AND USING SAME

RELATED APPLICATIONS

This application is a continuation of U.S. application Ser. No. 17/015,462, filed Sep. 9, 2020, which will issue May 31, 2022, as U.S. Pat. No. 11,348,485, which claims priority to U.S. Provisional Application No. 62/897,902, filed on Sep. 9, 2019. The disclosure of each is incorporated by reference in its entirety herein.

FIELD OF DISCLOSURE

The disclosure relates generally to the field of printed signs. More specifically, the disclosure relates to shelf sign systems and to methods of making and using same.

BACKGROUND

A retailer may couple a shelf sign to a shelf to direct the attention of consumers to the products situated on the shelf. The shelf sign may include the name or other identifier of the products, an image thereof, an offer related thereto, and/or other relevant information. The prior art shelf signs have an integral (i.e., a one-piece) construction and are printed only on one side. The one-piece construction and single sided printing of the prior art shelf signs limits adaptability.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In an embodiment, a shelf sign system comprises a base portion having a shelf member configured to be secured to a shelf, an extender extending from the shelf member, and a sign receiver arranged at an end of the extender opposite the shelf member. The sign receiver includes a head having a curved outer surface and two grooves defining a neck. A width of the neck is less than a width of the head. The shelf sign system includes a first sign portion configured to be removably coupled to the base portion. Each of two opposing surfaces of the first sign portion are configured to be printable. The first sign portion has a longitudinal coupling opening having a laterally extending enlarged central aperture. The shelf sign system includes a second sign portion configured to be removably coupled to the sign receiver. The first sign portion is removably coupled to and suspended from the base portion whereby the head extends through the coupling opening such that the head rests in front of the sign portion and at least a portion of the extender extends behind the sign portion.

In another embodiment, a method of making and using a shelf sign system comprises providing a shelf sign system. The shelf sign system has a base portion having a shelf member configured to be secured to a shelf, an extender extending from the shelf member, and a sign receiver arranged at an end of the extender opposite the shelf member. The sign receiver includes a head having a curved outer surface and two grooves defining a neck. A width of the neck is less than a width of the head. A first sign portion is configured to be removably coupled to the base portion. Each of two opposing surfaces of the first sign portion are configured to be printable. The first sign portion has a coupling opening having an enlarged central aperture. The shelf sign system includes a second sign portion configured to be removably coupled to the sign receiver. The method includes the step of suspending the first sign portion from the base portion by passing the head through the coupling opening and rotating one of the first sign portion and the base portion such that the head rests in front of the sign portion and at least a portion of the extender extends behind the sign portion.

In an embodiment, a shelf sign system comprises a base portion having a shelf member configured to be secured to a shelf, an extender extending from the shelf member, and a sign receiver arranged at an end of the extender opposite the shelf member. The sign receiver comprises a head and two grooves defining a neck. A width of the neck is less than a width of the head. The system includes a first sign portion configured to be removably coupled to the sign receiver. Each of two opposing surfaces of the first sign portion are configured to be printable. The first sign portion has a coupling opening. The system includes a second sign portion configured to be removably coupled to the base portion. The first sign portion is removably coupled to and suspended from the base portion whereby the head extends through the coupling opening.

In an embodiment, a method of using a shelf sign system comprises procuring the shelf sign system. The shelf sign system comprises a base portion having a shelf member configured to be secured to a shelf. The shelf member has a groove. An elongated extender extends from the shelf member adjacent the groove. A sign receiver is arranged at an end of the extender opposite the shelf member and comprises a neck that is proximate the extender relative to a head of the sign receiver. A first sign portion is configured to be removably coupled to the sign receiver. Each of two opposing surfaces of the first sign portion is configured to be printable. The first sign portion includes a coupling opening having an enlarged central aperture. A second sign portion is configured to be removably coupled to the sign receiver. The method comprises securing the shelf member to the shelf and suspending the first sign portion from the base portion by passing the head through the coupling opening. The method includes suspending the second sign portion from the base portion after disassociating the first sign portion from the base portion.

In another embodiment, a shelf sign system comprises a base portion having a shelf member configured to be secured to a shelf. The shelf member has a groove. An elongated extender extends from the shelf member adjacent the groove. A sign receiver is arranged at an end of the extender opposite the shelf member and comprises a neck that is proximate the extender relative to a head of the sign receiver. A first sign portion is configured to be removably coupled to the sign receiver. Each of two opposing surfaces of the first sign portion is configured to be printable. The first sign portion comprises a coupling opening having an enlarged central aperture. And, a second sign portion is configured to be removably coupled to the sign receiver.

In yet another embodiment, a method of using a shelf sign system comprises procuring the shelf sign system. The shelf sign system comprises a base portion having a shelf member configured to be secured to a shelf. The shelf member comprises two grooves. An elongated extender extends from the shelf member between the two grooves. A sign receiver is arranged at an end of the extender opposite the shelf member and has a neck that is proximate the extender relative to a head of the sign receiver. A first sign portion is configured to be removably coupled to the sign receiver. The first sign portion comprises a coupling opening having an enlarged central aperture. A second sign portion is configured to be removably coupled to the sign receiver. The method comprises securing the shelf member to the shelf and suspending the first sign portion from the base portion by passing the head through the coupling opening. The method includes suspending the second sign portion from the base portion after disassociating the first sign portion from the base portion.

DETAILED DESCRIPTION

Single piece shelf signs are known in the art. The prior art sign is of unitary construction and has printed matter only on the front side. The back side of the prior art sign has no printed matter. Thus, once the indicia printed on prior art sign is no longer relevant or useful, the entire sign has to be discarded, which may be undesirable.

Figure 1:
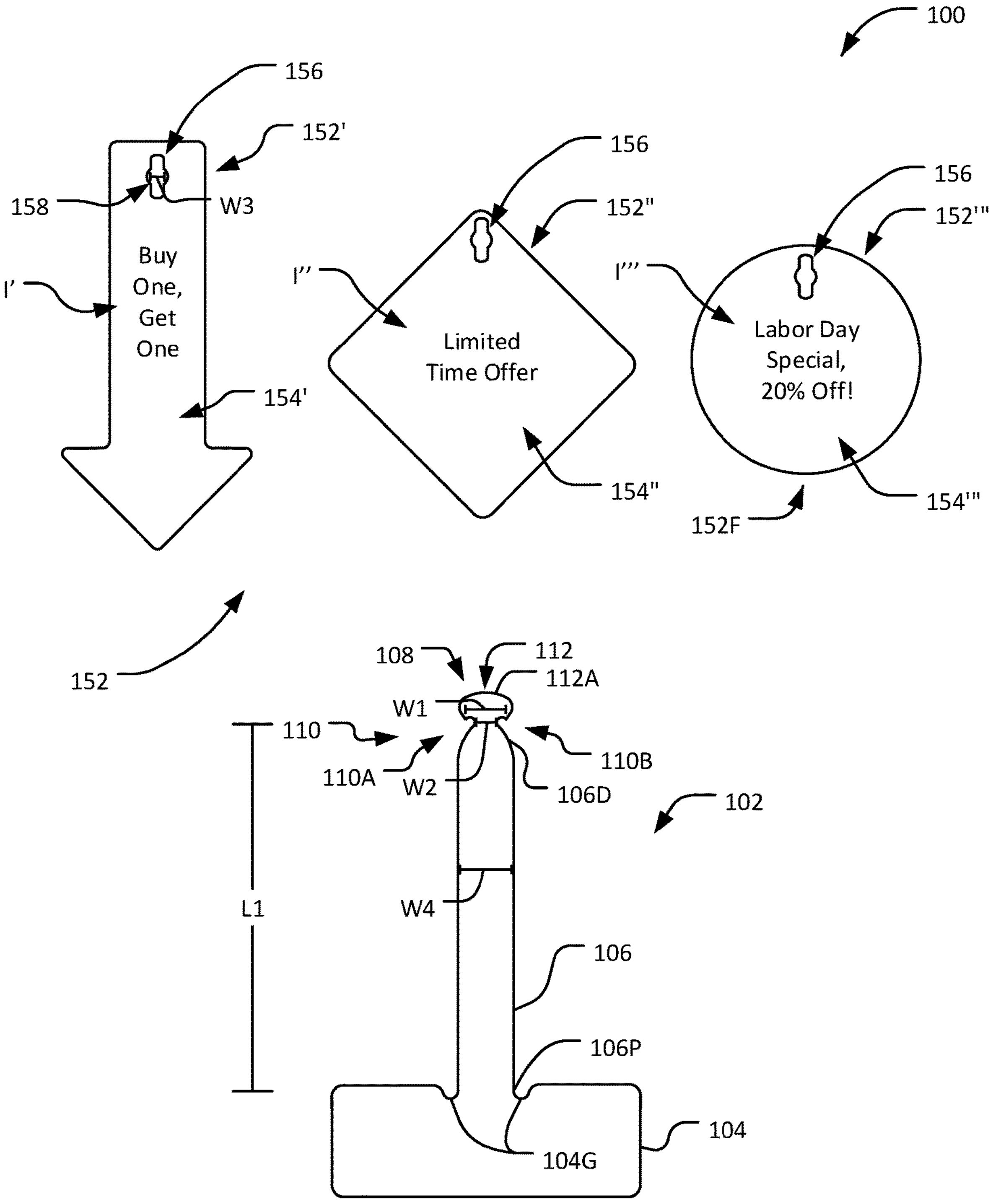
FIG. 1 is a front view of a shelf sign system having a base portion and sign portions, according to an embodiment of the present disclosure.

Focus is directed to FIG. 1 which shows a shelf sign system 100, according to an embodiment. The shelf sign system 100 has at least one base portion 102 and a plurality of interchangeable sign portions 152 each of which may be selectively coupled to the base portion 102. In the illustrated embodiment, the sign portions 152 include a sign portion 152', a sign portion 152", and a sign portion 152'".

The base portion 102 may be made of PVC, composite, synthetic, paper, plastic, and the like. The base portion 102 may be of unitary construction and may comprise a shelf member 104, an extender 106, and a sign receiver 108.

The base portion 102 may originate at the shelf member 104. The shelf member 104 may be generally rectangular or take on other symmetrical or nonsymmetrical shapes. The shelf member 104 may be configured to be slid into a shelf tag. Alternately or in addition, the shelf member 104 may be configured to be adhered to a retail shelf directly, e.g., via pressure sensitive tape, adhesive, in a shelf receiving area, or other means.

Figure 2:
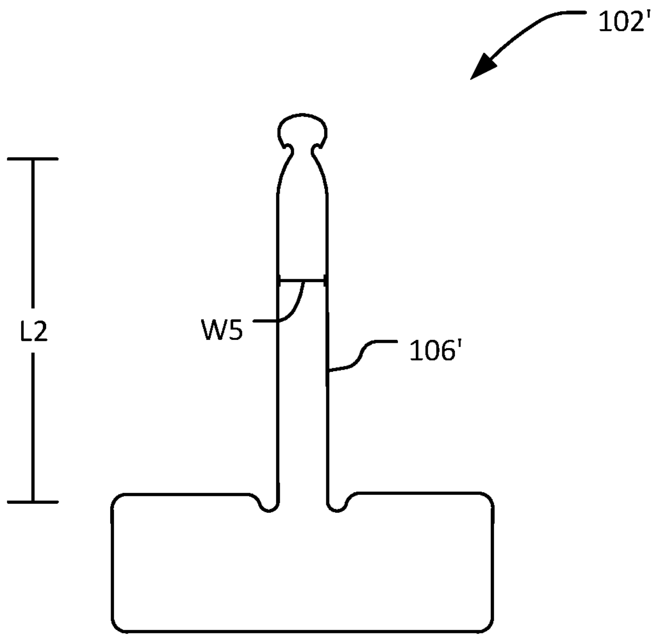
FIG. 2 is a front view of an alternative base portion of the shelf sign system of FIG. 1.
Figure 5:
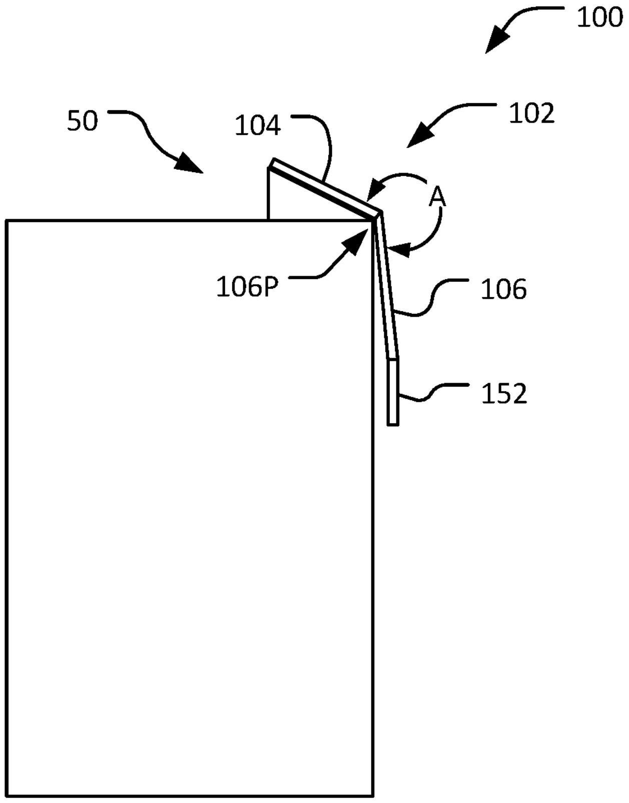
FIG. 5 is a schematic view of the shelf sign system of FIG. 1, attached to a shelf.

The extender 106 may extend from the shelf member 104 and have proximal end 106P proximate the shelf member 104 and a distal end 106D that is some distance (e.g., two inches or more) away from the shelf member 104. The extender 106 may have a maximum width W4. The dimensions of the extender 106 may vary from one base portion to another. For example, FIG. 2 shows a base portion 102' whose extender 106' is shorter (i.e., a length L2 may be less than a length L1) and narrower (i.e., a width W5 may be less than the width W4) than the extender 106 of base portion 102. Base portions of other shapes and sizes may also be employed, though it may be preferable for the base portions to have at least a shelf portion 104 and a sign receiver 108. In embodiments, the shelf member 104 may have one or more shelf member grooves 104G. The shelf member grooves 104G may allow the extender 106 to more easily flex at the proximal end 106P (as shown in FIG. 5), thereby reducing the chance that undesirable damage (e.g., tearing) may occur when the extender 106 is moved relative the shelf portion 104, such as when a sign portion 152 is attached to the base portion 102, or if a gust of wind moves the extender 106.

The sign receiver 108 may extend from the distal end 106D of the extender 106. The sign receiver 108 may have a neck 110 and a head 112. The neck 110 may be proximate the extender distal end 106D and may have two grooves or reduced-width areas 110A and 110B. The neck 110 may lead to the head 112. The head 112 may have a curved outer surface 112A. The base portion 102 may terminate at the head 112, and specifically at the curved outer surface 112A thereof.

The neck 110 may have a minimum width W2 and the head 112 may have a maximum width W1. The minimum width W2 of the neck 110, because of the reduced-width areas 110A and 110B thereof, may be less than the maximum width W1 of the head 112.

The base portion 102 may, in embodiments, be configured to be printable. For example, in embodiments, a name of a store, a logo, various artwork, barcodes, patent numbers, etc., may be printed on the front and/or back of the base portion. The base portion 102 may further be laminated, and in embodiments, may include one of various finishes (e.g., may be textured, have a matte or gloss finish, et cetera). In embodiments, the base portion 102 may be constructed of a material that is of a rigidity such that the base portion 102 maintains an angle A (FIG. 5) that a user desires. For example, the user may bend the extender 106 at the proximal end 106P such that the extender 106 extends from shelf member 104 at a thirty degree (or other) angle. The base portion 102 construction may then remain at that angle A until otherwise manipulated. Such a base portion 102 construction may be desirable where a user wishes to angle the shelf sign system 100 in such a way to make the indicia printed on the shelf sign system 100 more visible.

The sign portions 152 may be made of PVC, composite, synthetic, paper, plastic, and the like. The sign portions 152 may be laminated. In embodiments, the sign portions 152 may be made using printed synthetic core with top and bottom laminate and then die cut to a desired shape.

The various sign portions 152 may take on different shapes and sizes. For example, in FIG. 1, sign portion 152' is in the shape of an arrow, sign portion 152" is in the shape of a diamond, and sign portion 152'" is in the shape of a circle. Of course, depending on the application, other sign portions 152 (and other base portions 102) having different dimensions (e.g., shape, size, thickness, color, et cetera) and appearance (e.g., print design, color, et cetera) may likewise be employed. For example, depending on the application, sign portions 152 may take on the shape of fruits, car batteries, soup cans, et cetera.

Each sign portion 152 may include a sign area configured for receiving printed indicia (e.g., an advertisement, a product identifier, an offer, an image, et cetera). For example, the sign portion 152' may have a sign area 154', the sign portion 152" may have a sign area 154", and the sign portion 152'" may have a sign area 154'". Each sign portion 152', 152", and 152''' may also have a coupling opening 156 die cut or otherwise formed therein. Further, the sign portions 152', 152", 152''' may have indicia I', I", I''' printed thereon, respectively. The coupling opening 156 of each sign portion 152', 152", and 152''' may, but need not, be identical. The coupling opening 156 may be proximate or at an edge of the respective sign area 154', 154", and 154''', or may be situated elsewhere. In an embodiment, the coupling opening 156 may comprise a longitudinal opening or slot having an enlarged central aperture 158. The central aperture 158 may have a width W3. The width W3 may be less than each of the maximum width W1 of the head 112 and the maximum width W4 of the extender 106, and may be greater or equal to the minimum width W2. Such an arrangement of widths may enable the sign portion 152 to be removably secured to the base portion 102.

Figure 3:
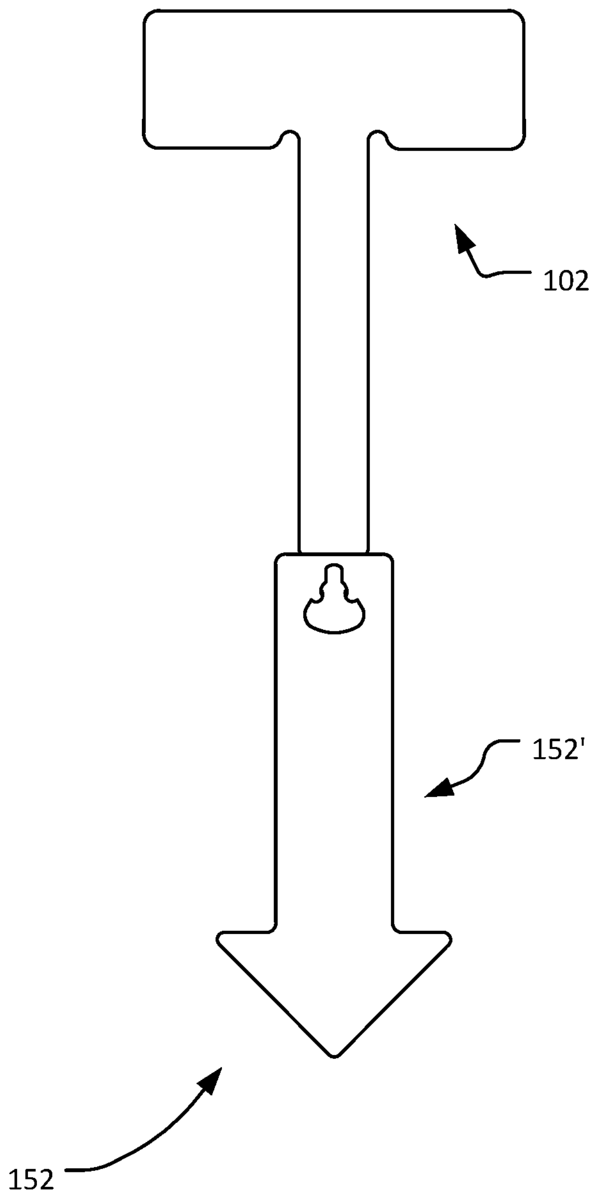
FIG. 3 is a front view of an alternative arrangement of the shelf sign system of FIG. 1

The coupling opening 156 of each sign portion 152', 152", and 152''' may be configured to allow the respective sign portion to be coupled to the base portion 102, and particularly, to the sign receiver 108 thereof. Specifically, the head 112 of the base portion sign receiver 108 may be passed through the coupling opening 156 of the respective sign portion 152 such that the head 112 extends beyond the respective sign portion 152, as shown in FIG. 3. The base portion 102 or the sign portion 152 may thereafter be rotated to complete the assembly. Because the respective maximum widths W1 and W4 of the head 112 and the extender 106 of the base portion 102 are each greater than the width W3 of the central aperture 158 of the sign portion 152, the respective sign portion 152 may lock to the base portion 102 and be securely held thereby. To illustrate, an example of an assembled sign portion 152 and base portion 102 are shown in FIG. 3. The sign portion 152 may likewise be unlocked from the base portion 102 by rotating the base portion 102 or the sign portion 152 and pulling the head 112 out of the coupling opening 156.

The shelf sign, comprising the base portion 102 and one of the sign portions 152', 152", and 152''' coupled thereto, may be situated on a shelf such that the base portion 102 (e.g., only the shelf member 104 thereof) is secured to the shelf and the respective sign portion 152 is clearly visible to the consumers and entices the consumers to purchase the product or products associated with the sign portion. The sign portion 152 may extend generally in the same plane as the extender 106 (e.g. the sign portion 152 may extend generally parallel to the extender 106 plus or minus fifteen degrees). When it is desirable to convey a different message to the consumers, the sign portion 152 (e.g., sign portion 152') coupled to the base portion 102 may be removed and a different sign portion 152 (e.g., sign portion 152" or sign portion 152''') may instead be coupled to the same base portion 102 to create in effect a new shelf sign. Doing so may not necessitate removal of the base portion 102 from the shelf. The interchangeable sign portions 152 may thus allow the same base portion 102 to be used to selectively display any one of a plurality of signs.

Figure 4:
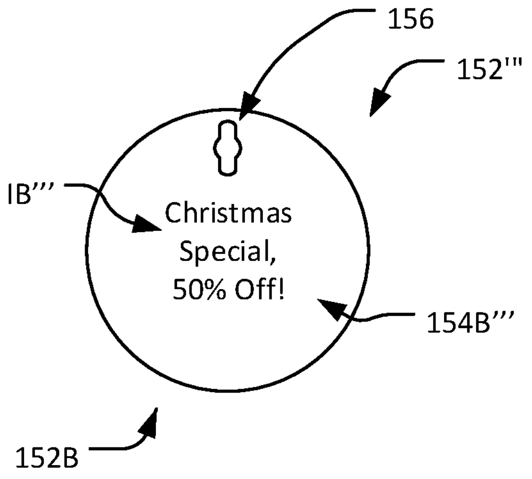
FIG. 4 is a rear view of one of the sign portions of the shelf sign system of FIG. 1.

Further, in embodiments, the sign portions 152 may be printable on both sides. Thus, as shown in FIGS. 1 and 4 for example, a front side 152F of the sign portion 152''' may include indicia I''' indicating an offer for a product for the current month and the back side 152B may have a back sign area 154B''' with indicia IB''' indicating an offer for the product for the another month. Similarly, one side of the sign portion 152 may include a weekday special whereas the other side may include a weekend or holiday special. And so on. Such may further increase the versatility of the signs.

In embodiments, the shelf sign system 100 may include a plurality of sign portions 152 at least one of which has a construction disparate from another sign portion in the system 100. For instance, a sign system 100 may include a PVC sign portion (e.g., for use in a wet environment) and a paper sign portion (e.g., for use in a dry environment). Or, a sign system 100 may include a sign portion 152 comprising composite material for use in one application and a sign portion 152 comprising PVC for use in another application. The shelf sign system 100 may likewise include a plurality of differently configured base portions 102 for use in different applications.

Figure 6:
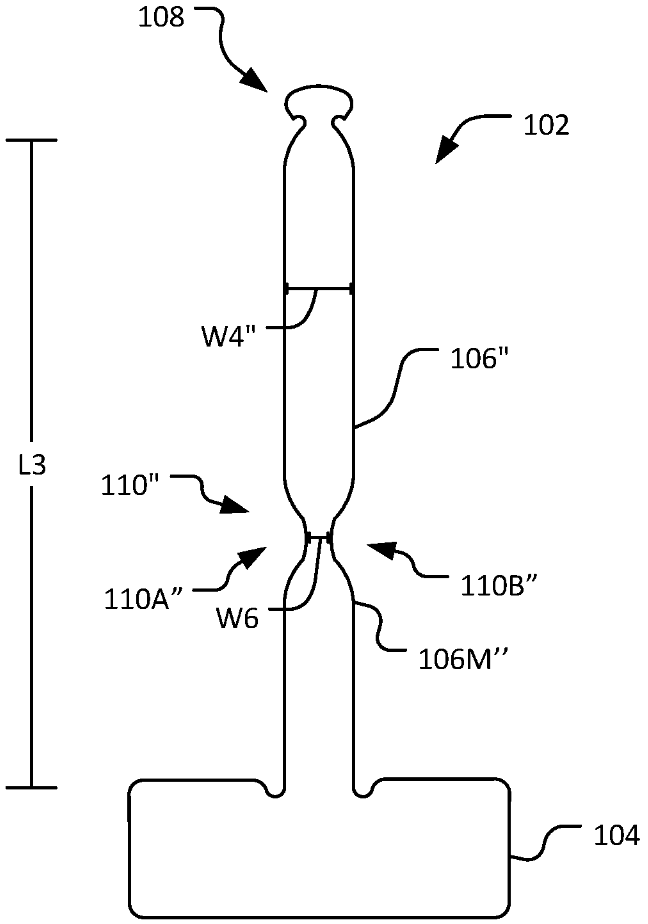
FIG. 6 is a front view of another alternative base portion of the shelf sign system of FIG. 1.

FIG. 6 illustrates an alternate extender embodiment 106" for holding a plurality of sign portions 152. Such embodiments may have a similar base portion 102 (i.e., similar sign receivers 108 and shelf members 104), except that the extender 106" may have an intermediate neck 110" with opposing grooves or reduced width portions 110A", 110B". The intermediate neck 110" may have a minimum width W6 that is less than a maximum width W4" of the extender 106P". The intermediate neck 110" may function similarly to the neck 110, in that the intermediate neck 110" may be configured to retain a sign portion 152. To couple a sign portion 152 to the intermediate neck 110", the head 112 may be inserted into the sign portion 152, and the sign portion 152 may be slid down to the intermediate neck 110". There, the sign portion 152 may be rotated into place. The intermediate neck 110" may be located at amounting point 106M" that lies along the length L3 of the extender 106". The location of the mounting point 106M" may be based on the size of the sign portion 152 to be used, such that the sign portion coupled to the intermediate neck 110" does not interfere (e.g., visibly interfere) with another sign portion 152 attached to the base portion (e.g., at the neck 110). Additionally, the length L3 of the extender 106" may be greater than length L2 of the extender 106' to accommodate the extra sign portions. Embodiments of the extender 106" may include a plurality of intermediate necks 110" to accommodate even more sign portions 152.

Thus, as has been described, the complementary construction of the base portion 102 and the sign portions 152 may allow the sign portions 152 to be removably locked to and suspended from the base portion 102 to convey the desired visual effect.

Figure 7:
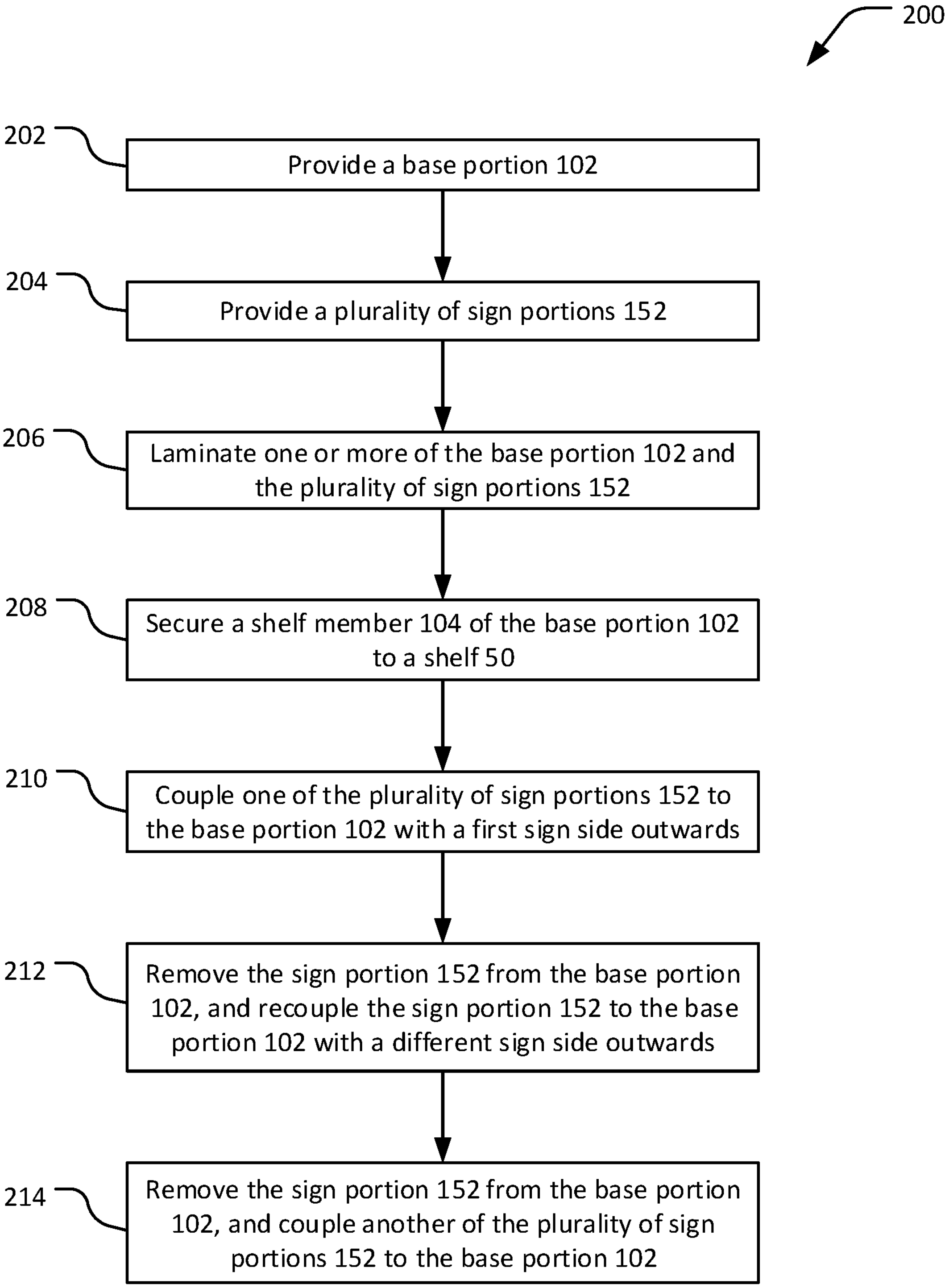
FIG. 7 is a flow chart illustrating a method of operating the shelf sign system of FIG. 1.

FIG. 7 is a flow chart illustrating a method 200 of operating the various embodiments of the shelf sign system described herein. First, at steps 202, a base portion 102 and a plurality of sign portions 152 may be provided, respectively. The sign portions 152 may have disparate indicia thereon. Then, at step 206, one or more of the base portion 102 and the plurality of sign portions 152 may be laminated. Next, at step 208, the shelf member 104 may be secured to a shelf 50 (e.g., a store shelf or display). The shelf member may be secured to other surfaces in embodiments, such as a window, display case, or display rack. The shelf member 104 may be secured to the shelf 50 using any suitable securing methods now known or subsequently developed, such as via adhesives or by slotting the shelf member 104 into a label holder. At step 210, one of the plurality of sign portions 152 may be removably coupled to the base portion 102. For example, the head 112 of the base portion 102 may be inserted into the coupling opening 156 of the sign portion, and then the sign portion may be rotated about the base portion neck 110 such that the sign portion 152 is locked into place. The sign portion 152 may be removed, at step 212, by reversing the steps of the step 210 (i.e., rotating the sign portion 152 and then sliding the sign portion 152 off of the base portion 102). The sign portion 152 may be flipped and coupled with the base portion 102 again so that a back side of the sign portion is visible. Step 214, like step 212, may involve removing the sign portion from the base portion 102, except that a second sign portion 152 is then attached to the base portion 102 using the instructions of step 210.

Those of ordinary skill in the art would understand that the steps of the method 200 may be modified, added to, or removed as is suitable. For example, where lamination is not desired, the step of laminating the shelf sign system 100 may be removed. As another example, the step of coupling the sign portion 152 to the base portion 102 may be performed before the step of securing the shelf member 104 of the base portion to the shelf 50.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations. Not all steps listed in the various figures need be carried out in the specific order described.

The disclosure claimed is:

1. A method of using a shelf sign system, comprising:

procuring said shelf sign system, said shelf sign system comprising:

a base portion comprising a shelf member configured to be secured to a shelf, said shelf member comprising a groove, an elongated extender extending from said shelf member adjacent said groove, a sign receiver arranged at an end of said extender opposite said shelf member and comprising a neck that is proximate said extender relative to a head of said sign receiver, and a second sign receiver arranged between said shelf member and said sign receiver, the second sign receiver comprising a second neck;

a first sign portion configured to be removably coupled to said sign receiver, each of two opposing surfaces of said first sign portion configured to be printable, said first sign portion comprising a coupling opening having an enlarged central aperture; and a second sign portion configured to be removably coupled to said sign receiver, wherein a shape of said second sign portion is disparate from a shape of said first sign portion;

securing said shelf member to said shelf, suspending said first sign portion from said base portion by passing said head through said coupling opening and bending said extender downwards at an angle only at a proximal end of said extender adjacent said groove; and suspending said second sign portion from said second neck of said second sign receiver.

2. The method of claim 1, further comprising bending said extender to cause said extender to extend from said shelf member at an angle to allow for said first sign portion suspended from said base portion to extend at a lateral distance from said shelf member.

3. The method of claim 1, further comprising suspending a third sign portion from said extender while said second sign portion is suspended from said extender.

4. The method of claim 1, wherein said shelf member is generally rectangular.

5. The method of claim 1, wherein said shelf member and said first sign portion extend in different vertical planes.

6. The method of claim 1, further comprising adhesively securing said shelf member to said shelf.

7. The method of claim 1, wherein said base portion is of unitary construction.

8. The method of claim 1, wherein a width of said central aperture is less than a width of said head.

9. The method of claim 8, wherein the width of said central aperture is less than a maximum width of said extender.

10. The method of claim 9, wherein the width of said central aperture is equal to or greater than a width of said neck.

11. A method of using a shelf sign system, comprising:

procuring said shelf sign system, said shelf sign system comprising:

a base portion comprising a shelf member configured to be secured to a shelf, said shelf member comprising two grooves, an elongated extender extending from said shelf member between said two grooves, a sign receiver arranged at an end of said extender opposite said shelf member and comprising a neck that is proximate said extender relative to a head of said sign receiver, and a second sign receiver arranged between said shelf member and said sign receiver, the second sign receiver comprising a second neck;

a first sign portion configured to be removably coupled to said sign receiver, said first sign portion comprising a coupling opening having an enlarged central aperture; and a second sign portion configured to be removably coupled to said sign receiver;

securing said shelf member to said shelf, suspending said first sign portion from said base portion by passing said head through said coupling opening;

laminating each of said first sign portion and said second sign portion; and suspending said second sign portion from said second neck of said second sign receiver.

12. The method of claim 11, further comprising bending said extender to cause said extender to extend from said base portion at an angle to allow for said first sign portion suspended from said base portion to extend at a lateral distance from said shelf member.

13. The method of claim 11, further comprising suspending a third sign from said extender while said second sign is suspended from said extender.

14. A shelf sign system, comprising:

a shelf member having a shelf member maximum width, said shelf member being configured to be secured to a shelf, an extender having an extender maximum width and an extender length, said extender extending from an end of said shelf member adjacent a groove of said shelf member;

a sign receiver located at an end of said extender opposite said shelf member, said sign receiver comprising a neck having a neck maximum width and a head having a head maximum width, said neck being located between said extender and said head; and a sign portion configured to be removably coupled to said sign receiver, said sign portion having a printable face and an aperture, said aperture having an aperture length and an aperture width, said aperture length being greater than said aperture width;

wherein:

said shelf member maximum width is greater than said extender maximum width;

said neck maximum width is less than each of said extender maximum width and said head maximum width;

said head maximum width is less than said extender maximum width;

said aperture width is less than said head maximum width;

said aperture width is less than said extender maximum width;

said aperture width is equal to or greater than said maximum head width; and said aperture length is parallel to said extender length when said sign portion is removably coupled to said sign receiver.

* * * * *